United States Patent [19]
Axmark et al.

[11] 3,732,452
[45] May 8, 1973

[54] ULTRAVIOLET RADIATION DETECTOR WITH 360° ANGULAR SENSITIVITY
[75] Inventors: Roger E. Axmark, Fridley; Clifford W. Erickson, Minnetonka, both of Minn.
[73] Assignee: Honeywell Inc., Minneapolis, Minn.
[22] Filed: Nov. 24, 1971
[21] Appl. No.: 201,662

[52] U.S. Cl.............313/98, 250/83.3 UV, 313/100, 313/101, 313/185, 313/214, 313/216, 313/224
[51] Int. Cl.............................................H01j 39/04
[58] Field of Search..........................313/93, 98, 101, 313/100, 214, 185, 224, 216; 250/83.6 R, 83.3 UV, 43.5 R

[56] References Cited
UNITED STATES PATENTS

| 1,917,854 | 7/1933 | Rentschler | 313/101 |
|---|---|---|---|
| 2,162,792 | 6/1939 | Teves et al. | 313/98 |
| 3,394,280 | 7/1968 | Trumble | 313/98 |

*Primary Examiner*—Palmer C. Demeo
*Attorney*—Lamont B. Koontz et al.

[57] ABSTRACT

An ultraviolet sensitive gaseous discharge detector has an essentially uniform 360° angular sensitivity. The detector has first and second anodes and a cathode which are aligned in a common plane. The first and second anodes have elongated cross-sections, with the elongated surfaces of the first and second anodes being aligned essentially parallel to the common plane. The cathode has an essentially circular cross-section and is disposed between the first and second anodes.

11 Claims, 7 Drawing Figures

PATENTED MAY 8 1973

COMMON PLANE

COMMON PLANE

COMMON PLANE

INVENTOR.
ROGER E. AXMARK
CLIFFORD W. ERICKSON

BY *[signature]*

ATTORNEY.

PATENTED MAY 8 1973

COUNTS PER MINUTE

INVENTOR.
ROGER E. AXMARK
CLIFFORD W. ERICKSON

BY

ATTORNEY.

ULTRAVIOLET RADIATION DETECTOR WITH 360° ANGULAR SENSITIVITY

REFERENCE TO RELATED PATENT APPLICATIONS

Reference should be made to co-pending patent application entitled Ser. No. 201,672 by Robert G. Johnson and Benjamin T. McClure which was filed on an even date herewith and which is assigned to the same assignee as the present invention.

BACKGROUND OF THE INVENTION

This invention is related to radiation sensitive, gaseous discharge detectors of the Geiger-Mueller type. More particularly, it is concerned with a low cost ultraviolet sensitive detector having structurally rigid electrodes and essentially uniform 360° angular sensitivity to ultraviolet radiation.

What is meant by "Geiger-Mueller detector" is a radiation detector having an anode and a cathode disposed in an ionizable gas, and which, upon being subjected to radiation to which it is sensitive, causes an electron to be present within the electric field established by the anode and cathode, whereupon the electron accelerates toward the anode, ionizing the gas, and causing a glow discharge current to flow, which current must be subsequently quenched by means of a quenching mechanism.

One particularly useful ultraviolet sensor is described in U.S. Pat. No. 3,488,492 to R. J. Niksarian which is assigned to the same assignee as the present invention. In this detector a pair of relatively straight wire-type electrodes are positioned in a gas filled envelope. This detector exhibits a non-uniform angular sensitivity to ultraviolet radiation. Maximum sensitivity is exhibited at 45° from the plane of the two electrodes. Minimum sensitivity occurs in the plane of the two electrodes. This minimum sensitivity, or "zero angle blind spot", is due to the shadowing effect of the anode which blocks radiation from striking the surface of the cathode.

While the directional sensitivity described above is highly advantageous in some radiation sensing systems, there are applications in which an ultraviolet sensor having uniform sensitivity over a broad viewing angle is desirable. For instance, fire detection systems requiring broad area surveillance often utilize several sensors to achieve uniform angular sensitivity. It is highly advantageous to utilize a single sensor rather than several sensors.

SUMMARY OF THE INVENTION

The radiation detector of the present invention comprises a cathode and first and second anodes aligned in a common plane within an envelope. A gaseous filling is contained in the envelope. The first and second anodes each have an elongated cross-section, and the elongated surfaces of the first and second anodes are aligned essentially parallel to the common plane. The cathode has an essentially circular cross-section and is disposed between the first and second anodes.

The radiation detector of the present invention exhibits an essentially uniform 360° angular sensitivity while retaining the electrode ruggedness and low cost of the prior art radiation detector having two closely spaced cylindrical electrodes.

DESCRIPTION OF THE PREFERRED EMBODIMENTS

Figure 1:
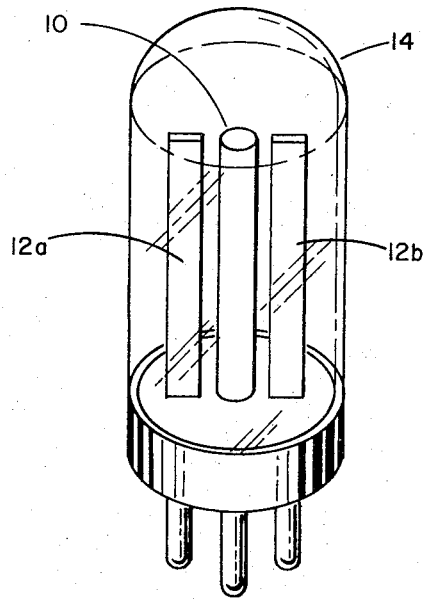
FIG. 1 shows the radiation detector of the present invention.

FIG. 1 shows the radiation detector of the present invention, which will hereafter be referred to as the "double knife-edge anode detector". Cathode 10 and first and second anodes 12a and 12b respectively are aligned in a common plane. Cathode 10 is disposed between first and second anodes 12a and 12b and has an essentially circular cross-section. First and second anodes 12a and 12b have elongated cross-sections, with the elongated surfaces of each anode being aligned essentially parallel to the common plane. Envelope 14 encloses cathode 10 and first and second anodes 12. Contained within envelope 14 is a gaseous filling which may be, for example, a hydrogen-helium or a hydrogen-neon gas mixture.

Figure 2:
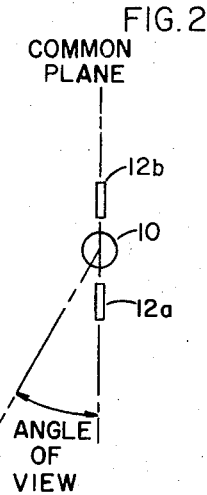
FIG. 2 shows a top view of the cathode and the first and second anodes of the radiation detector of the present invention.

FIG. 2 shows a top view of cathode 10 and first and second anodes 12a and 12b and illustrates the alignment of the electrode in a common plane. In the preferred embodiment, each of first and second anodes 12a and 12b has a cross-sectional width which is less than about 30 percent of the cross-sectional diameter of cathode 10.

Particularly successful double knife-edge anode detectors have been fabricated in which the cathode diameter is between about 0.015 inches and 0.100 inches. As described above, the preferred cross-sectional width of each of the anodes is less than about 30 percent of the diameter of cathode 10. Molybdenum, nickel, and tungsten are three desirable anode and cathode materials. However, the invention is not limited to these materials. The spacing between cathode 10 and each of first and second anodes 12a and 12b is between about 0.004 inches and about 0.012 inches, with the desired operating voltage influencing the particular spacing chosen. When a hydrogen-neon gas mixture comprises the gaseous filling in the detector, the preferred gas composition is between about 7 percent hydrogen to about 25 percent hydrogen, with the balance being neon. The gas pressure is preferrably between about 100 torr and about 600 torr. As will be described later, the particular gas composition and pressure selected will be influenced by the desired operating voltage of the detector.

Figure 3:
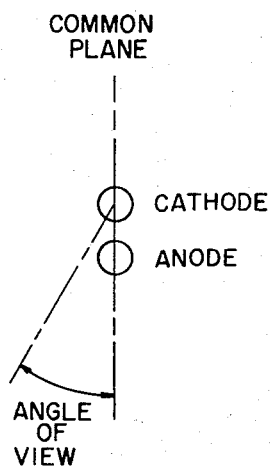
FIG. 3 shows a top view of the anode and cathode of a prior art detector.

FIG. 3 shows a top view of the anode and cathode of the prior art radiation detector described previously. In one typical prior art detector the anode and cathode have circular cross-section and are formed from tungsten. The diameter of each electrode is 0.030 inches and the separation between the electrodes is 0.006 inches. A hydrogen-neon gas mixture comprises the gaseous filling within the envelope.

Figure 4:
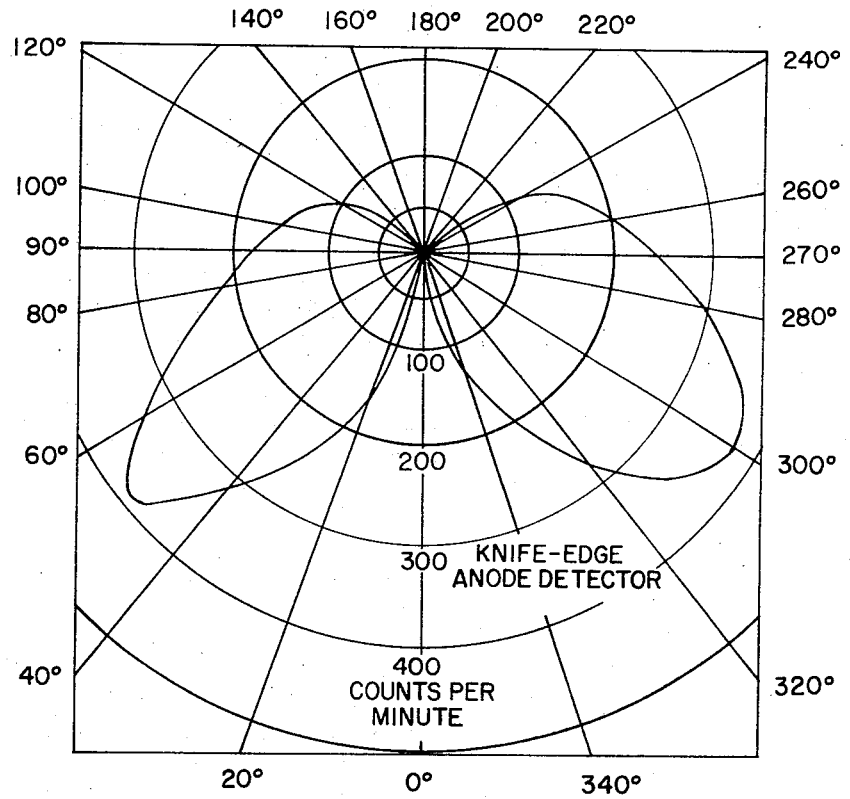
FIG. 4 shows the angular sensitivity of a typical prior art detector of the type shown in FIG. 3.

FIG. 4 shows the angular sensitivity of the prior art detector described above to a natural gas flame positioned at 38 inches from the detector and having a gas flow of 138cc per minute. The anode and cathode of the prior art detector were each 0.030 inches in diameter and were separated by 0.006 inches. A 7 percent hydrogen — 93 percent neon gas mixture at 300 torr comprised the gaseous filling. The prior art detector exhibited maximum sensitivity at ±45° from the common plane of the two electrodes. Minimum sensitivity occurs at the plane of the two electrodes. As described previously, this minimum sensitivity, or zero angle blind spot, is due to the shadowing effect of the anode which blocks radiation from striking the surface of the cathode. In addition, it should be noted that at angles between 135° and 225° the prior art detector exhibits minimum sensitivity. This minimum sensitivity is because only that portion of the cathode adjacent to the anode is effectively sensitive to ultraviolet radiation.

It can be seen that the double knife-edge anode detector allows much more radiation to hit cathode 10 from the first anode direction than the prior art radiation detector shown in FIG. 3. While a reduction in the shadow effect of first anode 12a could be achieved by merely reducing the size of the anode in FIG. 3, such a reduction severely reduces rigidity against vibration in the common plane. The danger of shorting between the anode and cathode is significantly increased. On the other hand, in the double knife-edge anode detector the only direction in which appreciably more vibration can occur is the direction perpendicular to the common plane. This does not produce any decrease of spacing between cathode 10 and either first anode 12a or second anode 12b, nor does it produce shorting of the electrodes. In fact, the deflection in the direction perpendicular to the common plane is less than in the prior art electrode configuration of FIG. 3 since there is less mass at the end of each of the anodes.

In the previously mentioned co-pending patent application entitled Ser. No. 201,672 by Robert G. Johnson and Benjamin T. McClure it is shown that the use of a single knife edge anode completely eliminates the zero angle blind spot. However, the single knife edge anode configuration does not eliminate the minimum sensitivity of the detector at angles between 135° and 225°. The double knife-edge anode detector eliminates this minimum sensitivity which was present in both the prior art detector and the knife edge anode detector.

Figure 5:
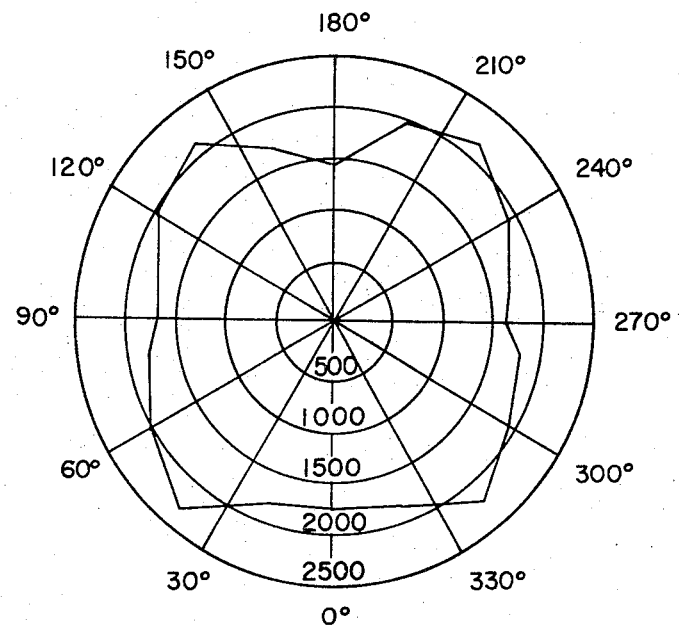
FIG. 5 shows the angular sensitivity of a detector of the present invention.

FIG. 5 shows the angular sensitivity of one particularly successful embodiment of the double knife-edge anode detector. The angular sensitivity of the detector was measured by using a natural gas flame positioned 38 inches from the detector and having a gas flow of 138cc per minute. Cathode 10 and first and second anodes 12a and 12b were formed from tungsten. Cathode 10 had a diameter of 0.030 inches. Each anode had a cross-sectional length of 0.030 inches and a cross-sectional width of 0.006 inches. The separation between cathode 10 and each of the anodes was 0.006 inches. A hydrogen and neon gas mixture having a pressure of 125 torr comprised the gaseous filling. As shown in FIG. 5, the double knife-edge anode detector exhibited relatively uniform angular sensitivity over the entire 360°.

The realization of a uniform sensitivity over the entire angle of view of the detector depends on the proper selection of fill gas pressure and detector voltage in the following way. The detection efficiency of the detector depends on the individual contributions of the various regions on the surface of the cathode with respect to the probability that a photoelectron emitted from the cathode, or one created in the gas in the vicinity of the cathode, will be able to create an avalanche of ions and electrons of sufficient magnitude to result in a measurable voltage breakdown pulse of current. Because of the relatively stronger electric field at points in the gas nearer the point of closest proximity between cathode and anode, the corresponding neighboring points at the cathode near the anode can emit photoelectrons with the best probability of producing strong avalanches and measurable current pulses. For a sufficiently great applied threshold voltage with a corresponding suitable fill gas pressure, the probability of a photoelectron yielding a measurable current pulse becomes unity if emitted at the cathode near the zero or 180° angle point on the surface. Correspondingly, electron emission from points on the cathode surface nearer to 90° or 270° will have much less than unity probability of generating a measurable current pulse. As the voltage is increased beyond the level at which the zero angle cathode point emission probability of generating a measurable pulse becomes unity, the probability of measurable current pulses being derived from emission at cathode points nearer to 90° becomes greater. As a result, the radiation impinging on the cathode at any viewing angle produces a greater response from the detector for voltages exceeding the threshold voltage. Once the threshold voltage is exceeded, a reduction in the fill gas pressure, or a reduction in hydrogen concentration or both, has a correspondingly similar effect in increasing the detection efficiency at angles nearer to 90° and 270° caused by the resulting increase in ionization efficiency for the electrons involved in the avalanches. By this means the greater part of the cathode surface can be made sensitive to the impinging radiation. Therefore, by properly selecting an adequate detector voltage and a suitable gas pressure and composition, the cathode can be made responsive over its entire surface resulting in a uniform angular sensitivity.

Figure 6:
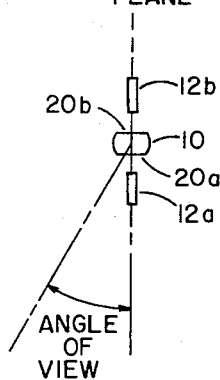
FIG. 6 shows a modified embodiment of the present invention.

FIG. 6 shows a modified double knife-edge anode detector exhibiting increased overall sensitivity from the detector shown in FIG. 2. Flattened surfaces 20a and 20b are provided on cathode 10 which oppose first and second anodes 12a and 12b respectively and are essentially normal to the common plane. It has been found that the electric field near cathode 10 is modified in such a way as to make it more uniform around the perimeter of cathode 10.

Figure 7:
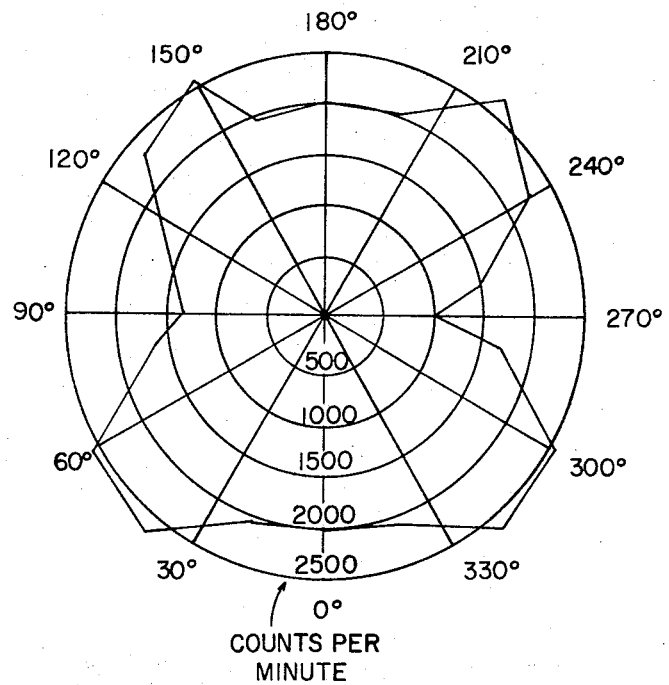
FIG. 7 shows the angular sensitivity of the detector shown in FIG. 6.

In one successful embodiment of the detector shown in FIG. 6, first and second anodes 12a and 12b were formed from tungsten and had a cross-sectional length of 0.030 inches and a cross-sectional width of 0.006 inches. Cathode 10 was formed from a tungsten wire having a cross-sectional diameter of 0.030 inches. The flattened surfaces on cathode 10 were formed by filing. The separation between cathode 10 and first and second anodes 12a and 12b was about 0.006 inches. A hydrogen-neon gas mixture having a pressure of about 125 torr comprised the gaseous filling within the envelope. As shown in FIG. 7, the modified double knife-edge anode detector exhibited improved overall sensitivity when measured under the same conditions used to obtain the angular sensitivity shown in FIG. 5.

The overall sensitivity of the double knife-edge anode detector for a given operating voltage may be increased several ways. First, a decrease in the hydrogen concentration of the gaseous filling causes an increase in sensitivity. Second, the gas pressure of the gaseous filling may be reduced, thereby achieving the same result as a reduction in hydrogen concentration. It should be noted, however, that too great a decrease in either gas pressure or hydrogen concentration will cause the detector to lose its ability to quench efficiently after each discharge, and a high rate of spurious discharges or "false counts" will occur.

It is to be understood that this invention has been disclosed with reference to a series of preferred embodiments and it is possible to make changes in form and detail without departing from the spirit and scope of the invention.

The embodiments of the invention in which an exclusive property or right is claimed are defined as follows:

1. An ultraviolet radiation detector comprising:
   a sealed envelope having a transparent portion,
   an ionizable gaseous filling contained within the envelope,
   a cathode of essentially circular cross-section aligned within the envelope, the cathode having an apparent cross-sectional diameter, and
   first and second anodes of elongated cross-section aligned within the envelope in a common plane with the cathode, the first and second anodes being disposed on opposite sides of the cathode, each anode having a cross-sectional length essentially parallel with the common plane and essentially perpendicular to the cathode and having a cross-sectional width essentially perpendicular to the common plane, wherein the cross-sectional widths of the first and second anodes are appreciably less than the apparent cross-sectional diameter of the cathode.

2. The radiation detector of claim 1 wherein each of the first and second anodes has a cross-sectional width which is less than about 30 percent of the cross-sectional diameter of the cathode.

3. The radiation detector of claim 1 wherein the cathode has a cross-sectional diameter of between about 0.015 inches and about 0.100 inches.

4. The radiation detector of claim 3 wherein the cathode and each of the first and second anodes are separated by between about 0.004 inches and about 0.012 inches.

5. The radiation detector of claim 1 wherein the cathode is composed of a metal of the group consisting of molybdenum, nickel, and tungsten.

6. The radiation detector of claim 1 wherein the first and second anodes are composed of a metal of the group consisting of molybdenum, nickel, and tungsten.

7. The radiation detector of claim 1 wherein the gaseous filling comprises a hydrogen and neon gas mixture.

8. The radiation detector of claim 7 wherein the hydrogen and neon gas mixture comprises about 7 percent to about 25 percent hydrogen, balance neon.

9. The radiation detector of claim 7 wherein the hydrogen and neon gas mixture has a pressure of between about 100 torr and about 600 torr.

10. The radiation detector of claim 1 wherein the gaseous filling comprises a hydrogen and helium gas mixture.

11. The radiation detector of claim 1 wherein the cathode has first and second flattened surfaces opposing the first and second anodes respectively, the first and second flattened surfaces being essentially normal to the common plane.

* * * * *